United States Patent [19]

Shichman

[11] 3,956,443

[45] May 11, 1976

[54] METHOD FOR COOLING TIRES DURING POST-INFLATION

[75] Inventor: Daniel Shichman, Trumbull, Conn.

[73] Assignee: Uniroyal Inc., New York, N.Y.

[22] Filed: July 3, 1974

[21] Appl. No.: 485,664

Related U.S. Application Data

[62] Division of Ser. No. 382,972, July 26, 1973, Pat. No. 3,852,008.

[52] U.S. Cl. ............................... 264/100; 264/237; 264/348
[51] Int. Cl.² ........................................ B29C 25/00
[58] Field of Search ............... 264/89, 94, 100, 237, 264/315, 326, 348; 425/38 P, 40, 42, 44, 50, 445

[56] References Cited
UNITED STATES PATENTS

| | | |
|---|---|---|
| 3,039,839 | 6/1962 | Waters et al. ........................ 264/100 |
| 3,075,237 | 1/1963 | Soderquist ........................... 425/44 |
| 3,488,809 | 1/1970 | James ................................ 425/327 |
| 3,541,191 | 11/1970 | Thordarson ..................... 264/237 X |
| 3,667,881 | 6/1972 | Cimprich ......................... 425/28 P |
| 3,792,145 | 2/1974 | Hugger et al. .................. 264/237 X |

*Primary Examiner*—Jan H. Silbaugh
*Attorney, Agent, or Firm*—Charles A. Blank

[57] ABSTRACT

A method for cooling a tire during a post-inflation treatment utilizing aspirator jets for discharging air internally of the tire and for entraining the inflation air of the tire to cause turbulent air flow against the internal surface of the tire and against tire-supporting means which is water-cooled to remove heat from the internal air of the tire. This invention results in tires which are at least as uniform, and generally more uniform, than externally jet air-cooled tires.

1 Claim, 10 Drawing Figures

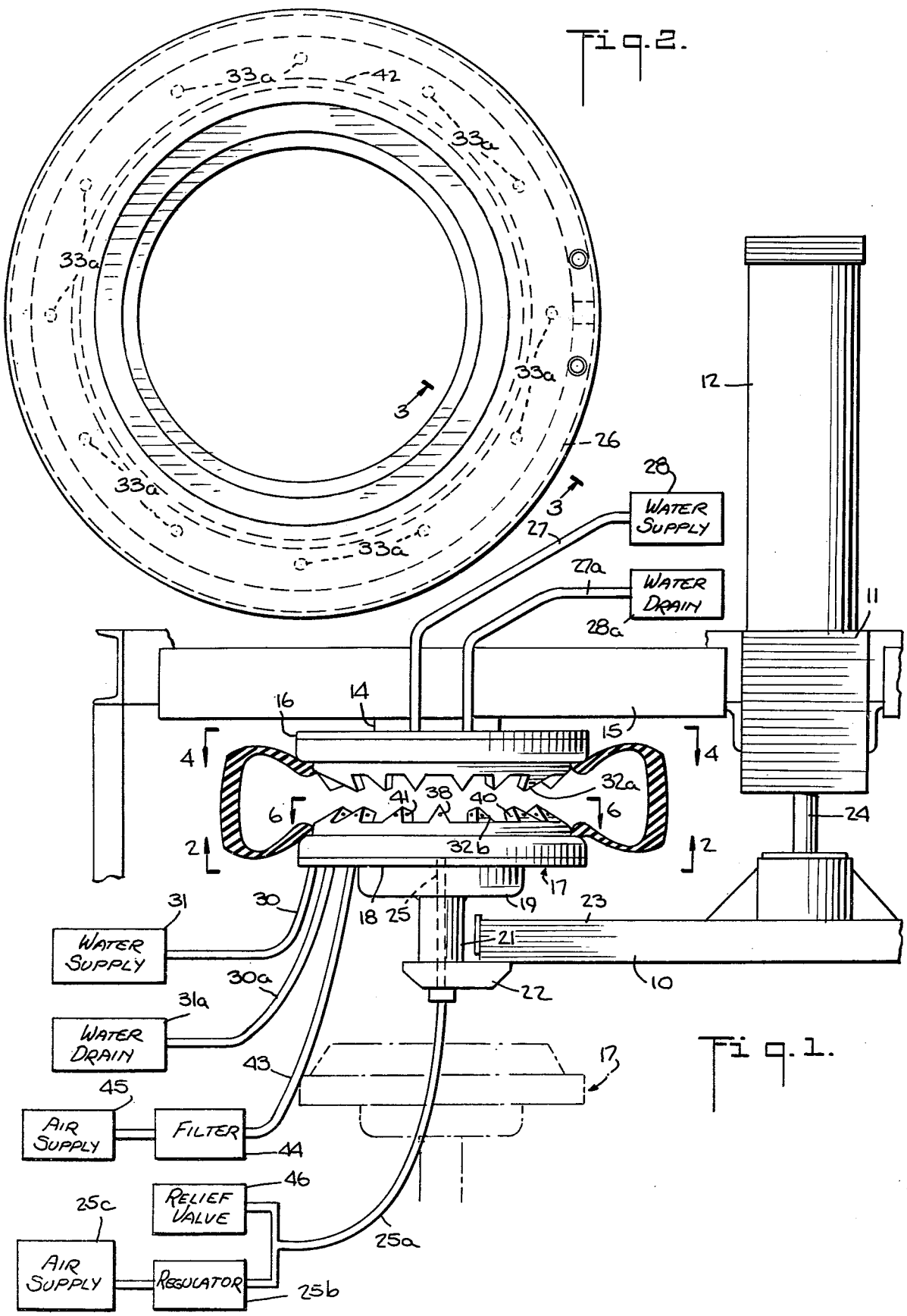

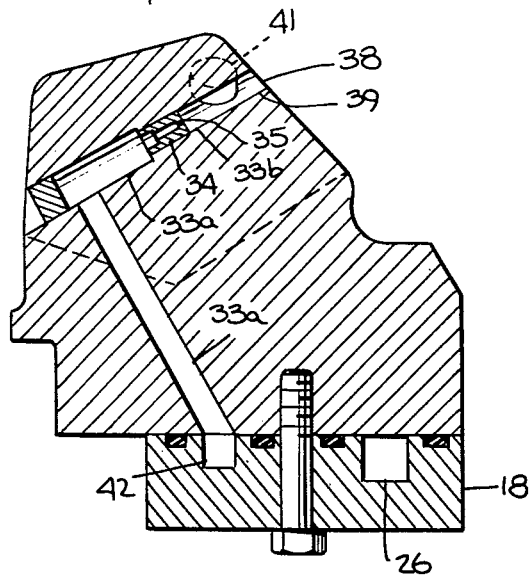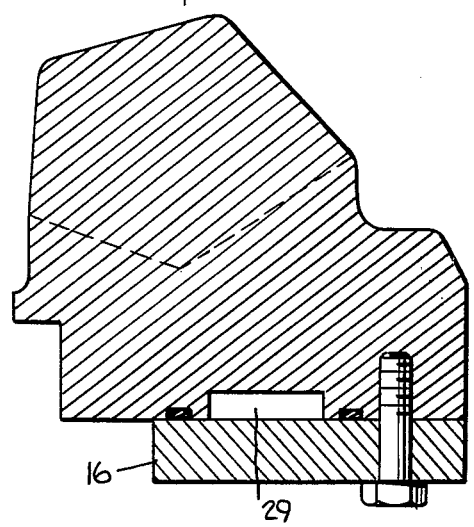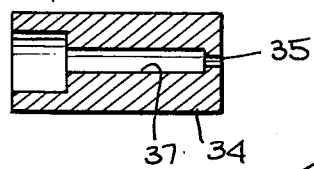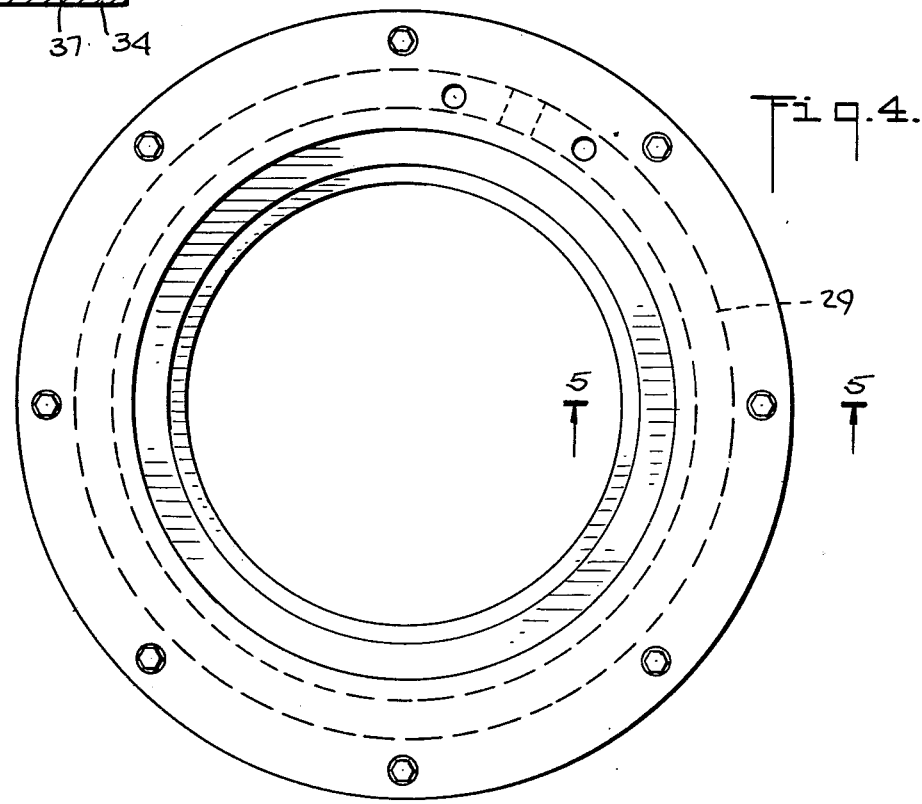

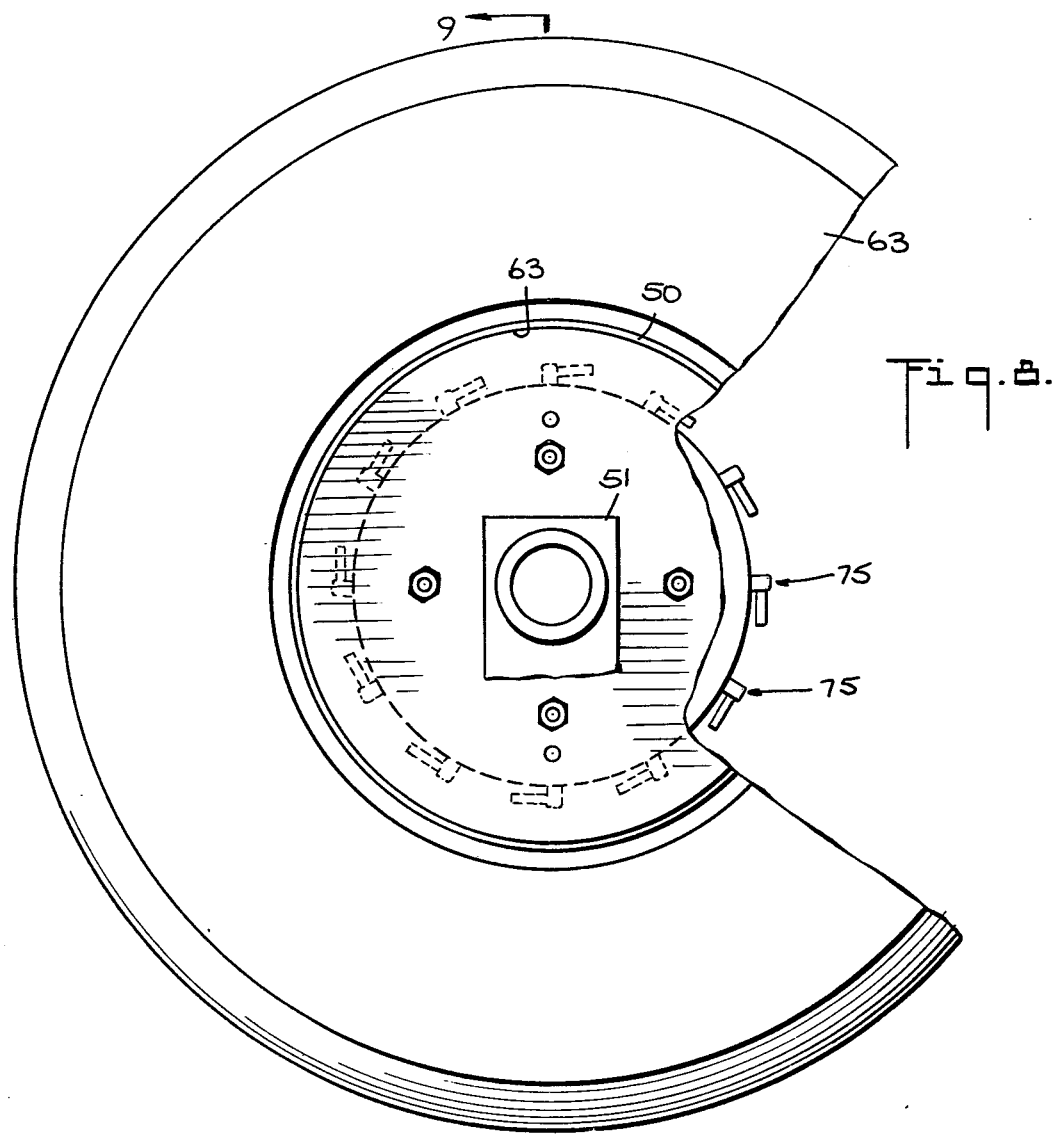
Fig.8.
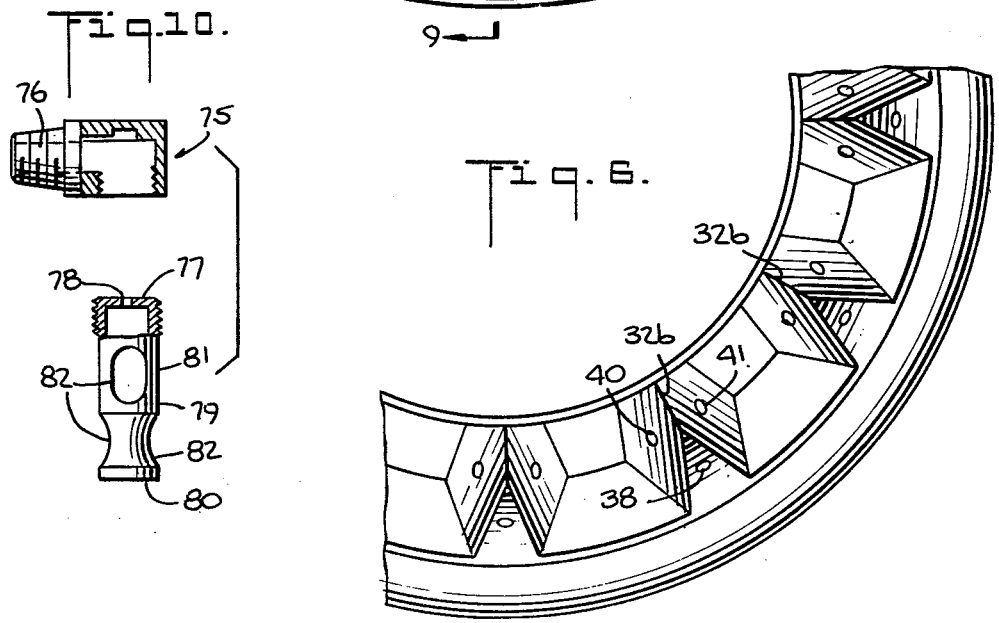
Fig.10.
Fig.6.

METHOD FOR COOLING TIRES DURING POST-INFLATION

This is a division of application Ser. No. 382,972, filed July 26, 1973 now U.S. Pat. No. 3,852,008.

This invention relates to a method for post-mold cycle cooling a pneumatic tire after the removal of the tire from the mold and during the course of a post-inflation treatment.

Post-inflation cooling may be by open air natural convection, subject to the limitations that the cooling rate is low and is not uniform over all portions of each tire, with the result that the tire may be non-uniformly cured and have radial dimensions which are circumferentially excessively non-uniform. To improve the uniformity of tires which are externally cooled, the cooling may be accomplished in two cycles. That is, the partially cured tire may be mounted on a rim, allowed to cool for 15 minutes, deflated, rotated 180°, reinflated and allowed to cool for another fifteen minutes. This procedure takes longer than is desirable. Tires can be cooled more rapidly and in a precisely controlled uniform manner by utilizing the apparatus for jet air cooling of tires described and claimed in U.S. Pat. No. 3,645,660.

Canadian patent 582,886 suggests internal cooling of tires by water or air but does not teach my apparatus or method.

An object of this invention, is to provide a novel method which produces a marked improvement in the uniformity of tires having thermoplastic continuous filament carcass tire cords such as nylon or polyester. This invention provides a post cure inflation cooling method which eliminates the heat-induced non-uniformity due to uneven cooling of carcass tire cords while under post cure inflation after cure.

The more evenly the tire cords of the carcass section of a tire are cooled while undergoing post inflation cooling, the higher the uniformity of quality throughout the tire. The uniformity of quality is reflected in reduced in-service growth, reduced tread groove cracking and more uniform tread wear. By this invention, air at or below ambient temperatures may be utilized to cool rapidly the carcass of a tire from the inside out, that is air may be applied to the whole carcass simultaneously and uniformly at the sidewall, shoulder and tread sections of the tire. Thus the tire is cooled uniformly both axially and circumferentially thereby enhancing the uniformity of construction in the tire, controlling inservice tire growth and giving uniformity of final tire size.

The preferred embodiment of the present invention utilizes a plurality of aspirator jets preferably located at equal intervals on the inside periphery of the tire rim and a circumferential inside cooling chamber. The aspirator jets provide a plurality of jet streams of gas preferably at or below ambient temperature and preferably at or near sonic velocity, thereby creating localized low pressure zones immediately in front of each jet causing thereby the entrainment of the internal air of the post inflated tire by up to about ten to twenty times the volume of gas that is made to flow through the jet orifices. The streams of gas and entrained air are made to flow axially against the inside surface of the tire causing a turbulent mixing action over the entire interior bead-to-bead surface and the inside surface of the tire rim. This turbulence causes an intensive scrubbing action between the entrained air and the interior surfaces of the tire and rim resulting in a transfer of heat from the entire interior surface of the tire to the turbulent entrained air and thence from entrained air to the inside surface of the tire rim. The tire rim is also provided with a circumferential channel whereby a flow of controlled coolant through said channel, preferably at or below ambient temperature, maintains the tire rim at or below ambient temperature during the post inflation cycle.

By maintaining the temperature of the tire rim itself at or below the ambient temperature, the tire rim acts as an efficient heat sink for the rapid transfer of heat from the turbulent entrained air to the tire rim. The mode of heat transfer from the inside surface of the tire to the air is turbulent forced convection and its rate can be controlled by the inlet conditions such as (1) the pressure and temperature of jet gas, (2) the temperature of tire rim coolant, (3) the number and the orientation of the aspirator jets, and (4) the size of the aspirator jet orifices.

By the method utilizing the principles of the above invention, the tire undergoing post inflation treatment is cooled externally by both radiation and natural convection of the ambient air and by the turbulent forced convention of the internal air. A sufficient amount of heat can be removed internally such that the amount of heat lost externally by radiation and natural convection plus the heat removed internally are sufficient to shorten the overall cooling cycle so that the total post inflation time can be made as short or shorter than the press cycle. By control of inlet conditions such that the internal surface of the tire is cooled to about 180° to 185°F, the remaining heat in all parts of the tire, including the tread section, is not sufficient to cause any significant shrinkage of the carcass cords.

It is an object of the present invention to provide a new and improved method for cooling a pneumatic tire during post-inflation which provides tires at least as uniform, and generally more uniform, as those provided by external jet air cooling.

It is another object of the invention to provide a new and improved method for cooling a pneumatic tire during post-inflation which is of simple construction.

It is another object of the invention to provide a new and improved method for cooling a pneumatic tire during post-inflation which provides more uniform tires in a shorter time in a single cycle than can be accomplished by open air natural convection cooling in two cycles.

In accordance with the invention, apparatus for post-mold cycle cooling a pneumatic tire, after the removal of the tire from the mold and during the course of a post-inflation treatment, comprises means for supporting a tire to be cooled, means for inflating the tire, and means for cooling the tire-supporting means. The apparatus includes means for discharging gas into the inflated tire comprising a gas-intake passageway, a gas-discharge passageway, and orifice means between said passageways for establishing gas flow communication therebetween, the gas-discharge passageway comprising a gas-discharge aperture and a lateral wall between the orifice means and the gas-discharge aperture. The lateral wall has a gas-intake aperture therein. The apparatus also includes means for supplying gas at higher pressure than gas in the tire to the gas-intake passageway of the gas-discharging means to cause gas flow through the orifice means effective to induce gas flow through the gas-intake aperture of the lateral wall and through the gas-discharge passageway against the interior surface of the tire and against the tire-supporting means to transfer heat from the tire to the gas therein and from the gas to the tire-supporting means. The apparatus also includes means for preventing a pressure build-up above a predetermined value inside the tire.

Also in accordance with the invention, the method of post-mold cycle cooling a pneumatic tire, after the removal of the tire from the mold and during the course of a post-inflation treatment, comprises supporting a tire to be cooled on tire-supporting means, inflating the tire, supplying cooling liquid to cool the tire-supporting means, supplying gas at higher pressure than the gas in the tire to induce gas flow against the interior surface of the tire and against the tire-supporting means to transfer heat from the tire to the gas therein and from the gas to the tire-supporting means, and preventing a pressure build-up above a predetermined value inside the tire.

Referring now to the drawings:

FIG. 1 is an elevational view, partly schematic, of apparatus constructed in accordance with the invention;

FIG. 2, is a view of the FIG. 1 apparatus taken along line 2—2 of FIG. 1;

FIG. 3 is a sectional view of the FIG. 2 apparatus, taken along line 3—3 of FIG. 2;

FIG. 4 is a view of the FIG. 1 apparatus, taken along line 4—4 of FIG. 1;

FIG. 5 is a sectional view of the FIG. 1 apparatus, taken along line 5—5 of FIG. 4;

FIG. 6 is a fragmentary view of the FIG. 1 apparatus, taken along line 6—6 of FIG. 1;

FIG. 7 is a view, to an enlarged scale, in section, of a portion of the FIG. 3 apparatus;

FIG. 8 is an elevational view of a portion of another embodiment of the invention;

FIG. 10 is an exploded view, partly in section, of a portion of the FIG. 9 apparatus.

Figure 9:
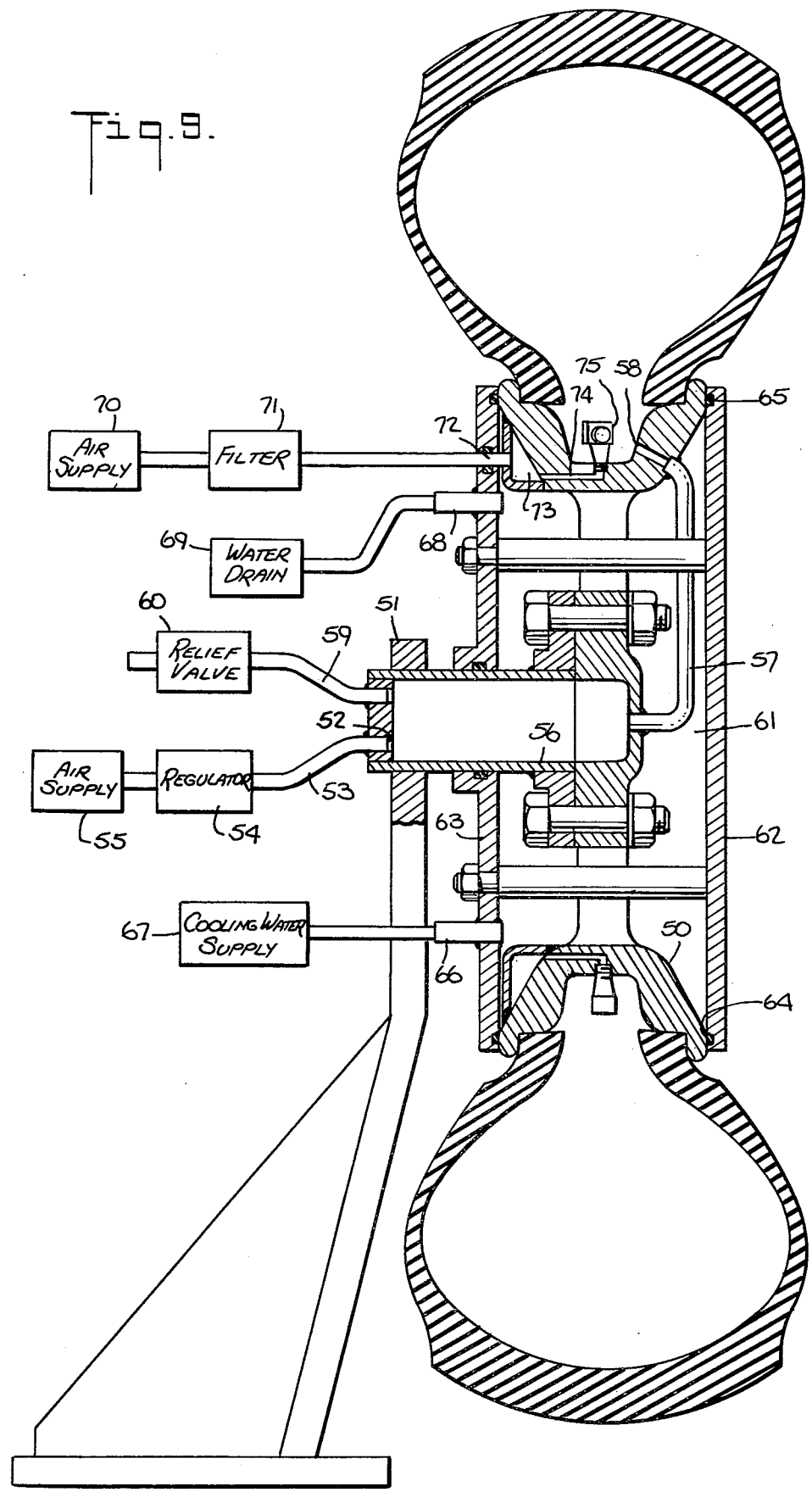
FIG. 9 is a partly schematic sectional view of the FIG. 8 apparatus, taken along line 9—9 of FIG. 8.

For a better understanding of the present invention, together with other and further objects thereof, reference is made to the following description taken in connection with the accompanying drawings, and its scope will be pointed out in the appended claims.

Referring now more particularly to FIG. 1 of the drawings, there is represented apparatus for postmold cycle cooling a pneumatic tire, after the removal of the tire from the mold and during the course of a post-inflation treatment, constructed in accordance with the invention. The apparatus represented in FIG. 1 represents one tire cooling station and it will be understood that a second such station (not shown) of similar construction may be attached to the supporting bar 10 and support 11 for the air cylinder 12 for simultaneous operation. The apparatus comprises means for supporting a tire to be cooled including a stationary chuck 13 having plate 16 attached to supporting members 14, 15. The tire-supporting means also includes movable chuck 17 having a plate 18 supported by movable members 19, 21, 22, 23 attached to the rod 24 of air cylinder 12.

The apparatus also includes means for inflating the tire comprising gas-intake passageway 25 connected by a flexible line 25a and a pressure regulator 25b to an air supply 25c.

Means for cooling the tire-supporting means 13 comprises a water chamber 29, represented in FIG. 4 and 5 connected by a suitable line 27 (FIG. 1) to water supply 28 and by a line 27a to a water drain 28a. Means for cooling the tire-supporting means 17 comprises a chamber 26, represented in FIGS. 2 and 3, connected through a flexible line 30 to a water supply 31 and through a flexible line 30a to a water drain 31a.

As represented in FIG. 1, the chucks 13, 17 have tire guiding members 32a, 32b which seat the beads of the tire on bead seats for inflation. The tire guiding members 32b of the chuck 17 are represented in fragmentary plan view in FIG. 6 and in sectional view in FIG. 3. As may be most clearly seen in FIG. 3, the apparatus includes means for discharging gas into the inflated tire comprising gas-intake passageway 33a, gas-discharge passageway 33b and orifice means 34 between the passageways for establishing gas flow communication therebetween. The orifice means 34 is represented in FIG. 7 as a nozzle having a circular orifice 35 therein of, for example, 0.01–0.03 inch diameter with a length to diameter ratio in the range of 1:1 to about 3:1 at the end of a passageway 37 of substantially larger cross-sectional area, for example, one-eighth inch diameter. The air-intake passageway 33a may have a diameter in the range of, for example, ⅛ to ¼ inch and the gas-discharge passageway 33b may have a diameter in the range of, for example, 3/16 inch to ½ inch.

The gas-discharge passageway 33b has gas-discharge aperture 38 and a lateral wall 39 between the orifice means 34 and the gas-discharge aperture 38. The lateral wall has a gas-intake aperture 40 therein in the range of, for example, ¼ inch to ½ inch diameter. A similar gas-intake aperture 41 extends through the opposite wall of the guiding member 32b into communication with the gas-discharge passageway 33b as represented in FIG. 6.

As represented in FIG. 6, each of the tire-guiding members 32b has gas-intake and gas-discharge passageways to provide a plurality of similar gas-discharging means preferably spaced at equal intervals on the internal periphery of the tire-supporting means.

The apparatus also includes means for supplying gas at higher pressure than the gas in the tire to the gas-intake passageway of the gas-discharging means to cause gas flow through the orifice means effective to induce gas flow through the gas-intake aperture of the lateral wall and through the gas-discharge passageway against the interior surface of the tire and against the tire-supporting means to transfer heat from the tire to the gas therein and from the gas to the tire-supporting means. The gas-supply means comprises gas chamber 42 (FIG. 3) in the tire-supporting means 17 (FIG. 1) connected through a flexible line 43, and a filter 44 to air supply 45. The air supply 25c and regulator 25b supply air at a pressure in the range of, for example, 10 to 50 pounds per square inch for inflating the tire and the air supply 45 supplies air to the air-intake passageways 33a at a higher pressure in the range of, for example, 20 to 100 pounds per square inch to cause air flow through the orifice means approaching from below or at sonic velocity. The air flow through the orifice means might also be above sonic velocity and the apparatus might utilize nozzles having convergent and divergent portions.

The apparatus also includes means for preventing a pressure build-up above a predetermined value inside the tire. This means comprises, for example, a relief valve 46 connected to the line 25a and set to prevent the tire pressure from exceeding, for example, 35 pounds per square inch. This pressure is called the post inflation pressure.

Considering now the operation of the FIG. 1 apparatus, the movable chuck 17 may be held in a lower position (represented in broken-line construction) under the control of air cylinder 12 and a tire placed thereon from a feed conveyor (not shown). The chuck 17 may then be raised to a position closer to chuck 13 than is represented in FIG. 1 to seat the beads of the tire, and then chuck 17 may be moved to the position represented in FIG. 1. The air supply 25c then supplies air at a temperature of, for example 80°F. to inflate the tire to a pressure of, for example 35 pounds per square inch. At the same time the air supply 45 supplies air at, for example, 80°F. through the filter 44 and line 43 into each of the intake passageways 33a and orifice means 34 in the tire-guiding members 32b. Referring to FIG. 3, the air at a pressure of, for example, twice the normal post inflation pressure flows through the intake passage 33a and the orifice of the orifice means 34 into the discharge passageway 33b. There is a sharp drop in pressure as the air flows through the orifice at a velocity near sonic velocity with the low pressure region extending past the intake aperture 40. This induces a large air flow into the apertures 40, 41 in the lateral wall of the discharge passageway 33b and through the discharge aperture 38. It is estimated that approximately a total of 7 cubic feet per minute flow through the orifice of the orifice means 34 in twelve tire-guiding members 32b and that a total air flow of 10 to 20 times the volume of air through the orifices of the orifice means 34 can be induced to flow through the apertures 40, 41. The air is discharged through the apertures 38 and strikes the inner surface of the tire, resulting in a high heat transfer coefficient from the tire to the air. At the same time the surfaces of the inner parts of the chucks are swept by the circulating air to transfer heat from the air to the water-cooled chucks. The input water supplied may be at a temperature of, for example, 70°F. In order to prevent the pressure in the tire from building up above a predetermined value, the relief valve 46 may be set to maintain a selected post inflation pressure in the range of, for example, 10 to 50 pounds per square inch. The cooling time may be, for example, fifteen minutes.

Referring now more particularly to FIGS. 8-10, inclusive, there is represented another embodiment of the invention in which means for supporting a tire to be cooled comprises a rim 50 mounted on a supporting member 51.

The apparatus includes means for inflating the tire comprising an air inlet 52 connected by a feed line 53 and a pressure regulator 54 to an air supply 55. The air inlet 52 supplies air through a chamber 56, line 57 and aperture 58 in the rim to inflate the tire. An outlet line 59 is also connected between the chamber 56 and a pressure relief valve 60.

Means for cooling the tire-supporting means 50 comprises a water chamber 61 between external plates 62, 63 having suitable seals 64, 65 to the rim 50 and having an inlet 66 connected to a cooling water supply 67. The input water supplied may be at a temperature of 70°F. A suitable outlet 68 is connected to a drain 69.

An air supply 70, a filter 71, and inlet 72 supply air to a circumferential chamber 73. The apparatus includes an air-intake passageway 74 extending to a jet 75 which is more clearly represented in FIG. 10. The jet 75 has an air-intake passageway 76 having a diameter in the range of, for example, ⅛ to ⅜ inch and orifice means comprising a wall 77 having an orifice 78 therein and an air-discharge passageway 79 comprising an air-discharge aperture 80 and a lateral wall 81 between the orifice means 77 and the aperture 80 having air-intake apertures 82 therein. The orifice 78 is, for example, a circular orifice having a diameter, for example in the range of 0.010 to 0.030 inch with a length to diameter ratio in the range of 1:1 to 3:1. The air-discharge aperture 80 may, for example, have a diameter of ¼ inch. The air-intake apertures 82 may, for example have a length of ½ and a width of ¼ inch.

There may be, for example, twelve jets similar to the jet 75 positioned around the internal circumference of the rim 50 as represented diagramatically in FIG. 9 with a 30° spacing between jets. The jets may be directed slightly toward the rim wall making an angle of, for example, 10° with the circumferential direction to facilitate heat exchange with the rim wall.

Considering now the operation of the FIG. 8 embodiment, inflation air is supplied at a temperature of, for example, 80°F. from the supply 55 through the regulator valve 54, which may be set to supply air at a pressure in the range, for example, 10 to 50 pounds per square inch for post-inflation of the tire through feed line 53, air inlet 52, chamber 56, line 57, and aperture 58. Relief valve 60 may be set to a pressure in the range of 10 to 50 pounds per square inch.

Air supply 70 supplies air at a temperature of, for example, 80°F. and at a pressure in the range of, for example, 20 to 100 pounds per square inch or approximately twice the post-inflation pressure through filter 71, inlet 72, chamber 73, and air-intake passageways 74 to the aspirator jets 75. In each aspirator jet there is a sharp drop in pressure as the air passes through the orifice 78 near sonic velocity with the low pressure region extending past the air-intake apertures 82. This induces a large flow of air through the apertures 82, with the air exiting from the aperture 80 of each aspirator jet being the sum of the air through the orifice 78 and through the apertures 82.

The air from the aspirator jets 75 strikes the water-cooled rim walls at an angle of, for example, ten degrees to effect good heat transfer from the air to the rim walls and to provide generally circumferential circulation of air within the tire with good heat transfer from the tire, particularly the tire shoulders, to the air. There is massive circulation of air inside the tire, with only a relatively small amount of air introduced into the tire through the orifices 78. The relief valve 60 prevents the pressure from building up about a predetermined value of, for example, 35 pounds per square inch. The cooling time may be, for example, 15 minutes. The heat transfer coefficients between the air and the rim surface and between the air and the tire surface may, for example, be in the range of 5 to 20 B.t.u./hr./sq.ft./°F.

I believe that apparatus of similar construction to the FIG. 1 apparatus but with the air-discharge passageways 38 at an angle to cause combined axial and circumferential air flow within the tire may provide a structure which gives maximum uniform cooling effect on a tire.

A direct comparison of tire uniformity was made of the internal cooling procedure of this invention during the post inflation period with jet air external cooling. The test run was made using L78-15 polyester tire cord tires with a two-ply glass fiber belted construction under the same conditions of manufacture and press curing. Press cures were made using a tire curing press of the type described in U.S. Pat. No. 3,170,187 equipped with dual, single cycle post inflators. One post inflator was modified for external air jet cooling as described in U.S. Pat. No. 3,645,660 while the adjacent post inflator was modified for internal cooling in accordance with the FIG. 1 embodiment of this invention. The conditions of press curing consisted of a press cycle of 14 minutes with an external temperature of 330°F and an internal temperature of 425°F. The ambient air temperature was 95°F and the temperature of the cooling water for internal cooling was 80 F. The post inflation cooling cycle of 15 minutes for both groups of tires was sufficient to lower the temperature of the inside surface in the shoulder areas of the tires to 180° to 185°F. Out of a test production run of 117 tires a group of 55 was internally cooled during the post inflation cooling cycle and a group of 62 was externally cooled during the post inflation cooling cycle. The internally cooled tire rim had twelve air aspirator jets with 0.020 inch orifices with a total air flow through these orifices of 7 cubic feet per minute. Both groups of tires were then tested for tire uniformity by measuring radial force variation which consisted in the application of a 1500 pound load and a one-inch deflection at a controlled rotational speed. The analysis of the radial force variation in terms of peak-to-peak radial force and the first harmonic of the force variation wave form disclosed the following:

a. The externally cooled tires showed an average peak-to-peak radial force variation of 44.5 pounds with a range of 24 pounds to 100 pounds and an average first harmonic value of 24.2 pounds with a range of 4 pounds to 50 pounds.

b. The internally cooled tires showed an average peak-to-peak radial force variation of 37.9 pounds with a range of 20 pounds to 56 pounds and an average first harmonic value of 16.5 pounds with a range of 4 pounds to 30 pounds.

A statistical analysis of the trial data showed that the differences in the averages of the radial force variation and first harmonic value were significant at a high (99%) level of confidence. Thus, the internally cooled tires were still more uniform than the externally cooled tires as evidenced by the fact that they had a 15% lower peak-to-peak radial force variation and a 17% lower first harmonic value. This greater uniformity of the internally cooled tires is not only reflected in better riding characteristics but results in a significant saving in the overall production of tires in terms of a lower rejection rate and lower reprocessing (rebuffing) costs.

For example, in the internally cooled tires, 47 out of 47 tires or 100 percent, were within the maximum allowable unbalance specification of 32 inch ounces. Inch ounces in tire terminology is a measure of tire unbalance and any tire exceeding the allowable limit is normally reprocessed (by rebuffing) to lower the unbalance to an amount somewhat below the maximum limit of 32 inch ounces In the case of the externally cooled tires, 2 out of 41 or 4.9 percent required rebuffing to bring them within the 32 inch ounce specification.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. The method of post-mold cycle cooling a pneumatic tire after removal of the tire from the mold and during the course of a post-inflation treatment, comprising:

supporting the tire to be cooled on a tire-supporting means having an interior chamber for circulating a cooling liquid therein;

inflating the tire to a predetermined inflation pressure with a gas;

supplying a controlled flow of cooling liquid through said chamber sufficient to maintain the inner surface of the tire-supporting means at or below ambient temperature during the post-inflation cycle;

thereafter, during said post-inflation cycle, injecting continuously controlled jet streams of gas into the inflated tire through a plurality of aspirator jets located at equal intervals on the inside periphery of the tire-supporting means, thereby creating localized low pressure zones immediately in front of each of said jets causing entrainment of the internal gas of the tire by over ten times the volume of said jet streams of gas that flow through the jets, said entrainment resulting in continued turbulence of the entrained gas to provide a scrubbing action between the entrained gas and the entire interior tire surface and the inner surface of said tire-supporting means thereby resulting in a continuous transfer of heat from the entire interior surface of the tire to the turbulent entrained gas and thence from the entrained gas to the cooled inner surface of the tire-supporting means;

and preventing a pressure build-up above a predetermined value inside the tire.

* * * * *